(12) United States Patent
Hazra (10) Patent No.: US 6,311,141 B1
(45) Date of Patent: *Oct. 30, 2001

(54) CONTROLLING A PHYSICAL RELATIONSHIP BETWEEN A DISPLAY AND A VIEWER OF THE DISPLAY

(75) Inventor: Rajeeb Hazra, Tualatin, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/109,571

(22) Filed: Jul. 2, 1998

(51) Int. Cl.[7] .................................................. G01C 9/00
(52) U.S. Cl. ............................ 702/150; 702/94; 348/55; 345/108; 345/181
(58) Field of Search .......................... 702/150, 151–153, 702/94–95; 348/55, 59; 345/427, 7–8, 104, 112, 121, 181, 184, 108, 110

(56) References Cited

U.S. PATENT DOCUMENTS

| 5,311,220 | * | 5/1994 | Eichenlaub | 348/55 |
| 5,349,379 | * | 9/1994 | Eichenlaub | 348/549 |
| 5,574,836 | * | 11/1996 | Broemmelsiek | 345/427 |

* cited by examiner

Primary Examiner—Marc S. Hoff
Assistant Examiner—Hien Vo
(74) Attorney, Agent, or Firm—Trop, Pruner & Hu, P.C.

(57) ABSTRACT

A method and an apparatus are used with a display. A physical relationship between the display and a viewer of the display is determined, and the physical relationship is monitored to detect when the relationship substantially changes. In response to the detection, the display is automatically positioned to compensate for the change.

27 Claims, 6 Drawing Sheets

CONTROLLING A PHYSICAL RELATIONSHIP BETWEEN A DISPLAY AND A VIEWER OF THE DISPLAY

BACKGROUND

The invention relates to controlling a physical relationship between a display and a viewer of the display.

A typical environment for a computer system includes a desk and a chair. In this manner, a user may sit at the desk to interact with a main computer unit (of the system) which may be located either underneath or on top of the desk. The user may also view a display (of the system) which may be located either on top of the desk or computer unit, as examples. The user may initially position (rotate and/or move the display, as examples) to adjust a physical relationship (a viewing distance and a viewing angle, as examples) between the display and the user. When seated at the desk, the physical relationship between the user and the display typically does not substantially change over time. As a result, repositioning of the display may not be necessary.

However, although the user may desire to view the display at all times, the view may become obscured when the physical relationship between the user and the display is not stationary. For example, the user may move around the office while conversing over a speakerphone. As another example, the display may be part of a living room computer system which may be viewed from many different locations in the room. Thus, the distance and viewing angle between the user and the display may continually change. These changes, in turn, may obscure the user's view of images that are formed on the display.

Thus, there is a continuing need for a viewing system that accommodates movement by a viewer of the system.

SUMMARY

In one embodiment, a method for use with a display includes determining a physical relationship between the display and a viewer of the display and detecting when the relationship substantially changes. In response to the detection, the display is automatically positioned to compensate for the change.

In another embodiment, a computer system includes a display, an assembly to position the display, a range finding device and a computer. The computer uses the range finding device to determine a physical relationship between the display and a viewer of the display; detect when the physical relationship substantially changes; and in response to the detection, interact with the assembly to position the display to compensate for the change.

DETAILED DESCRIPTION

Figure 1:
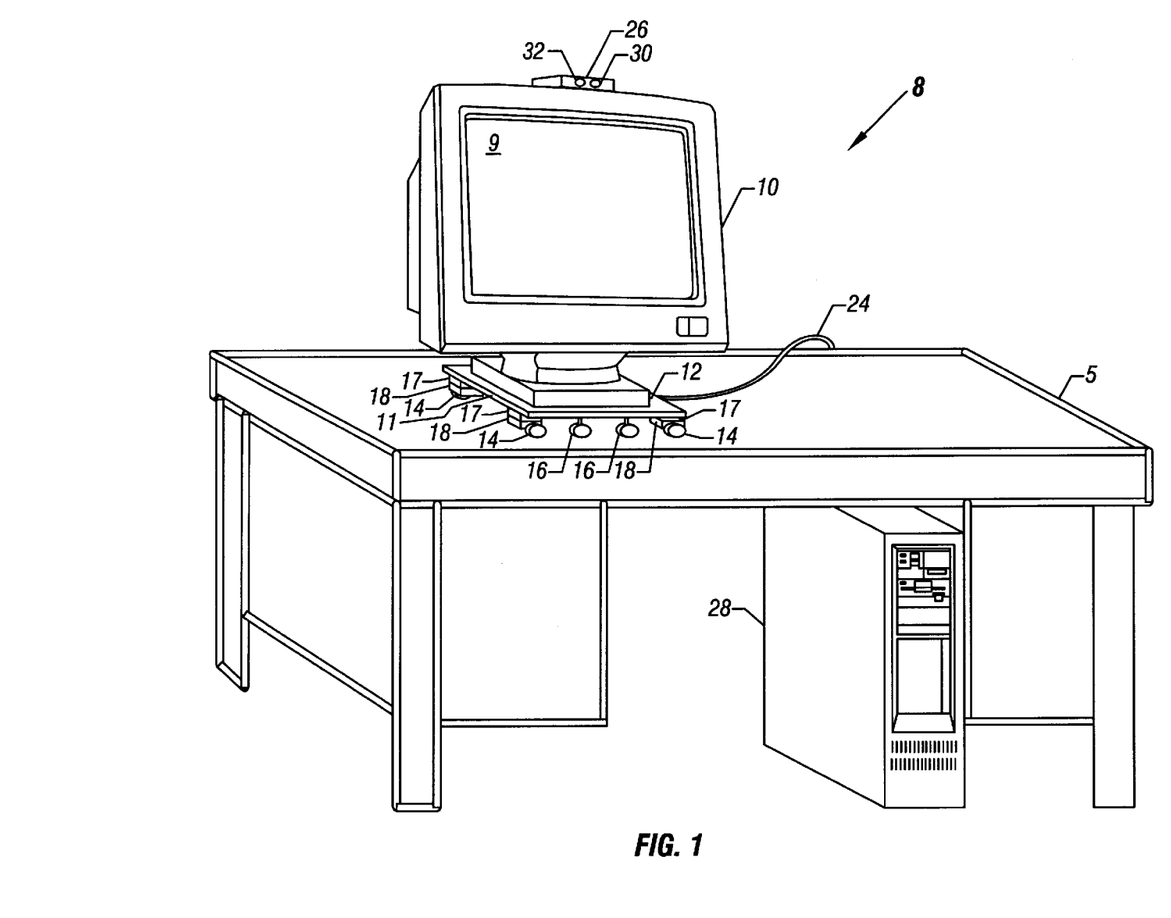
FIG. 1 is a perspective view of a computer system according to an embodiment of the invention.

Referring to FIG. 1, an embodiment 8 of a computer system in accordance with the invention includes a display 10 that is mounted on an assembly 12 which is capable of positioning (rotating and/or translating, as examples) the display 10. In some embodiments, the system 8 includes a computer unit 28 that interacts with a stereoscopic camera 26 (that is secured to the display 10) to detect when a physical relationship (a viewing distance, and/or a viewing angle, as examples) between a viewer of the display 10 and the display 10 substantially changes. In response to this change, the computer unit 28 may instruct the assembly 12 to position the display 10 to compensate for the change. For example, the computer unit 28 may instruct the assembly 12 to position the display 10 to restore a prior physical relationship (a prior viewing angle and/or viewing distance, as examples) between the display 10 and the viewer. In some embodiments, the physical relationship may be measured between a head of the viewer and a screen 9 of the display 10.

The advantages of automatically positioning a display to restore a prior physical relationship between the display and a viewer of the display may include one or more of the following: the viewer may maintain eye contact with a screen of the display while the viewer moves; the viewer may stay within view of a display-mounted camera that is part of a desktop conferencing system; optimal viewing angles and distances between the viewer and the display may be automatically maintained; and an existing computer system may be easily upgraded to implement the above-described features.

Figure 2:
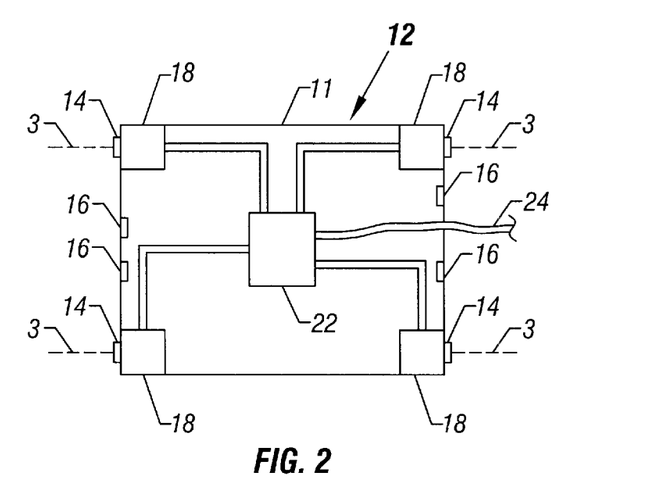
FIG. 2 is a bottom view of an assembly used to position the display of FIG. 1.

In some embodiments, rotating the display 10 includes rotating the display 10 to a predetermined bearing, and translating the display 10 includes moving the display 10 substantially along a line that follows the predetermined bearing. To accomplish these features, in some embodiments, the assembly 12 is located on top of a table 5 and is capable of moving across the top surface of the table 5 to position the display 10. The display 10 is secured to a plate 11 (of the assembly 12) which is parallel to the top surface of the table 5. Referring to FIG. 2, powered wheels 14 are operatively coupled to the underside of the plate 11 near the plate's corners and are effectively controlled (as described below) by a stepper motor controller 22 to translate and rotate the assembly 12 (and display 10) over the top surface of the table 5.

Figure 3:
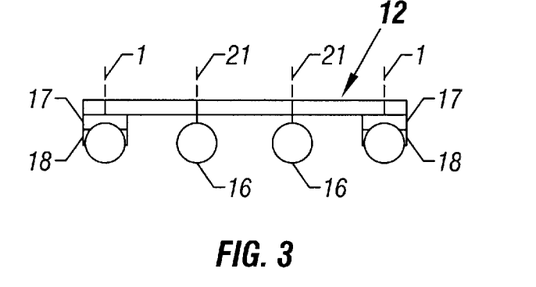
FIG. 3 is a side view of the assembly.

In some embodiments, the wheels 14 rotate the plate 11 (and display 10) until a screen 9 of the display 10 faces the predetermined bearing. To accomplish this, the assembly 12 includes four stepper motors 18, each of which drives a different one of the wheels 14 about a horizontal axis 3. Referring to FIG. 3, the assembly 12 also includes four stepper motors 17, each of which rotates a different one of the stepper motors 18 about a vertical axis 1. The motors 17 and 18 are controlled by the stepper motor controller 22. Thus, the controller 22 may simultaneously activate the stepper motors 17 to rotate the display 10 so that the screen 9 faces the predetermined bearing, and the controller 22 may simultaneously activate the stepper motors 18 to rotate the wheels 14 to advance the display 10 substantially along the predetermined bearing. Alternatively, in some embodiments, rotation and translation occur sequentially.

In other embodiments, fewer (two, for example) than all of the stepper motors 17 and 18 may be activated to rotate the wheels 14 about the vertical 1 and/or horizontal 3 axes. Furthermore, in some embodiments, rotation may concurrently occur with translation.

Referring back to FIG. 2, the stepper motors 17 and 18 are controlled by the stepper motor controller 22 which, in turn, responds to commands that are received (via a cable 24) from the computer unit 28. In some embodiments, communications between the computer unit 28 and the controller 22 occur via a serial bus protocol. The commands may include, for example, commands to move the assembly 12 to an absolute distance or by a relative distance. The commands may also include commands to rotate the assembly 12 by a relative bearing or to an absolute bearing.

Referring to FIG. 3, although the wheels 14 may be located at the corners of the plate 11, in some embodiments, additional caster wheels 16 may be pivotally mounted to the underside of the plate 11 to provide additional stability for the assembly 12. Each wheel 16 may pivot on a vertical axis 21 that is perpendicular to the plate 11 so that the wheels 16 readily align with the orientations of the wheels 14. In some embodiments, the wheels 16 are mounted between corners of the plate 11. Therefore, the wheels 16 help support the assembly 12 should one or more of the wheels 14 become suspended over the edge of the table 5. As described below, when the assembly 12 approaches the edge of the table 5, the assembly 12 does not move further in a direction that would cause the assembly 12 to drop off of the table 5.

Figure 4:
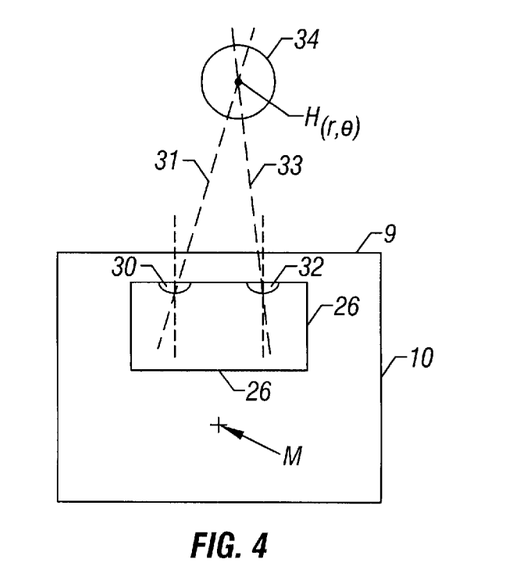
FIG. 4 is a schematic diagram illustrating a triangulation technique used by the computer system of FIG. 1.

Referring to FIG. 4, in some embodiments, the computer unit 28 uses the stereoscopic camera 26 to determine a polar coordinate point (called $H_{(R,\theta)}$) that represents the position of a head 34 of the viewer. To accomplish this, the computer 28 unit uses a technique called triangulation and two images (that are furnished by the camera 26) of the head 34 that are taken from different locations. In this manner, the camera 26 has two different lens assemblies 30 and 32 through which the camera 26 captures two different images of the head 34. The camera 26 furnishes electrical signals to transmit indications of the images to the computer unit 28, and the computer unit 28 uses the indications to perform the triangulation to determine the position of the head 34.

In this manner, using the image of the head 34 formed via the lens assembly 30, the head 34 appears to be located at a point on a line 31 that intersects the lens assembly 30. Likewise, using the image of the head 34 formed via the lens assembly 32, the head 34 appears to be located at a point on another line 33 that intersects the lens assembly 32. Although from any one image of the head 34 the computer unit 28 cannot determine the coordinates of the point $H_{(r,\theta)}$, the computer unit 28 may determine the intersection of the two lines 31 and 33 and thus, determine the coordinates of the point $H_{(r,\theta)}$ in relation to a point $M_{(r,\theta)}$ (a point on the display 10 or the assembly 12, as examples) that moves with the display 10 and is fixed with respect to the lens assemblies 30 and 32.

Alternatively, in place of the stereoscopic camera 26, two monoscopic cameras (not shown) may be used. In this manner, each of the monoscopic cameras may furnish indications of different images of the head 34 to the computer unit 28.

In some embodiments, the computer unit 28 attempts to maintain substantially the same distance and viewing angle between a screen 9 (see FIG. 1) of the display 10 and the head 34. To accomplish, the computer unit 28 sends commands to the controller 22 to rotate the display 10 to a predetermined bearing and sends commands to the controller 22 to move the display 10 substantially along the predetermined bearing for a predetermined distance. The translation and rotation may occur concurrently or at different times.

Figure 5:
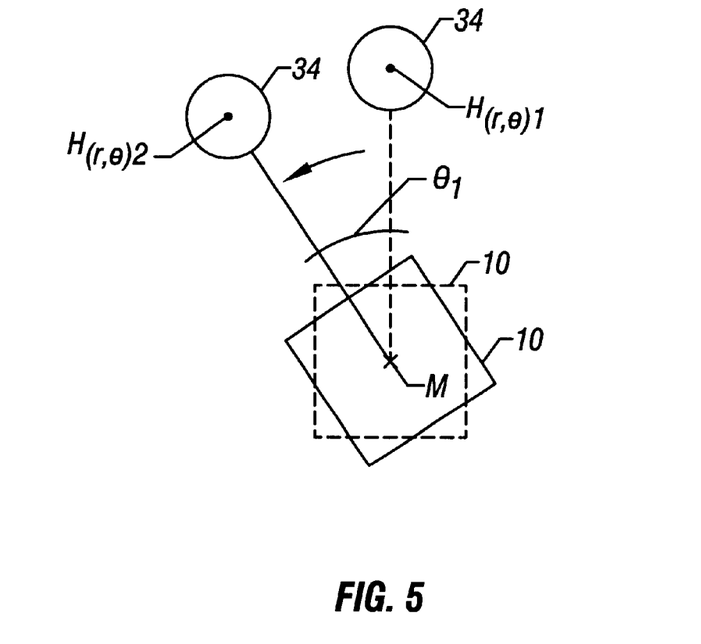
FIGS. 5 and 6 are schematic diagrams illustrating repositioning of the display after a viewer of the display moves.

Referring the FIG. 5, as an example, the head 34 may move from a point $H_{(r,\theta)1}$ to a point $H_{(r,\theta)2}$ which changes a viewing angle between the viewer and the display 10 by an angle $\theta_1$. In this example, the distance between the display 10 and the head 34 remains unchanged and thus, no translational movement is required. However, the computer unit 28 instructs the assembly 12 to rotate the assembly 12 by the angle $\theta_1$ to restore the original viewing angle between the viewer and display 10.

Figure 6:
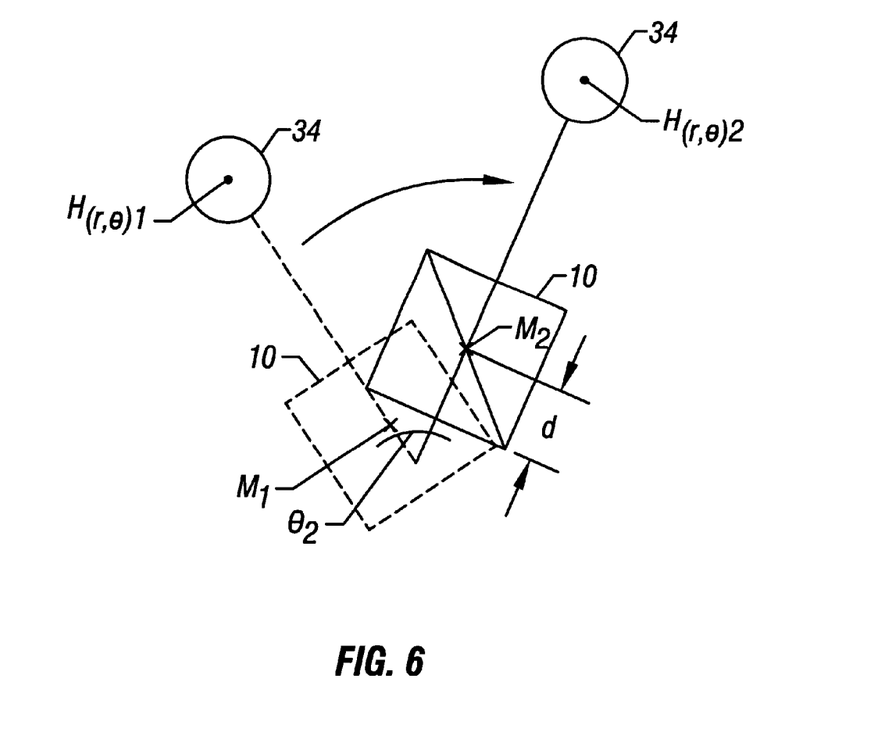

Referring to FIG. 6, as another example, both the viewing angle and the distance between the head 34 and the display 10 changes. For this example, the computer unit 28 corrects the viewing angle by rotating the display 10 by an angle $\theta_2$. The computer unit 28 also moves the display 10 for a predetermined distance d substantially along a line 35 that follows predetermined bearing to restore the original distance between the display 10 and the computer unit 28.

The viewing angle and distance between the display 10 and the head 34 may be selected by the user. The selection may include, for example, the user pressing a button to inform the computer unit 28 when the display 10 has a desired physical relationship with respect to the viewer. As another example, the user may program the viewing angle and distance into computer unit 28

Figure 7:
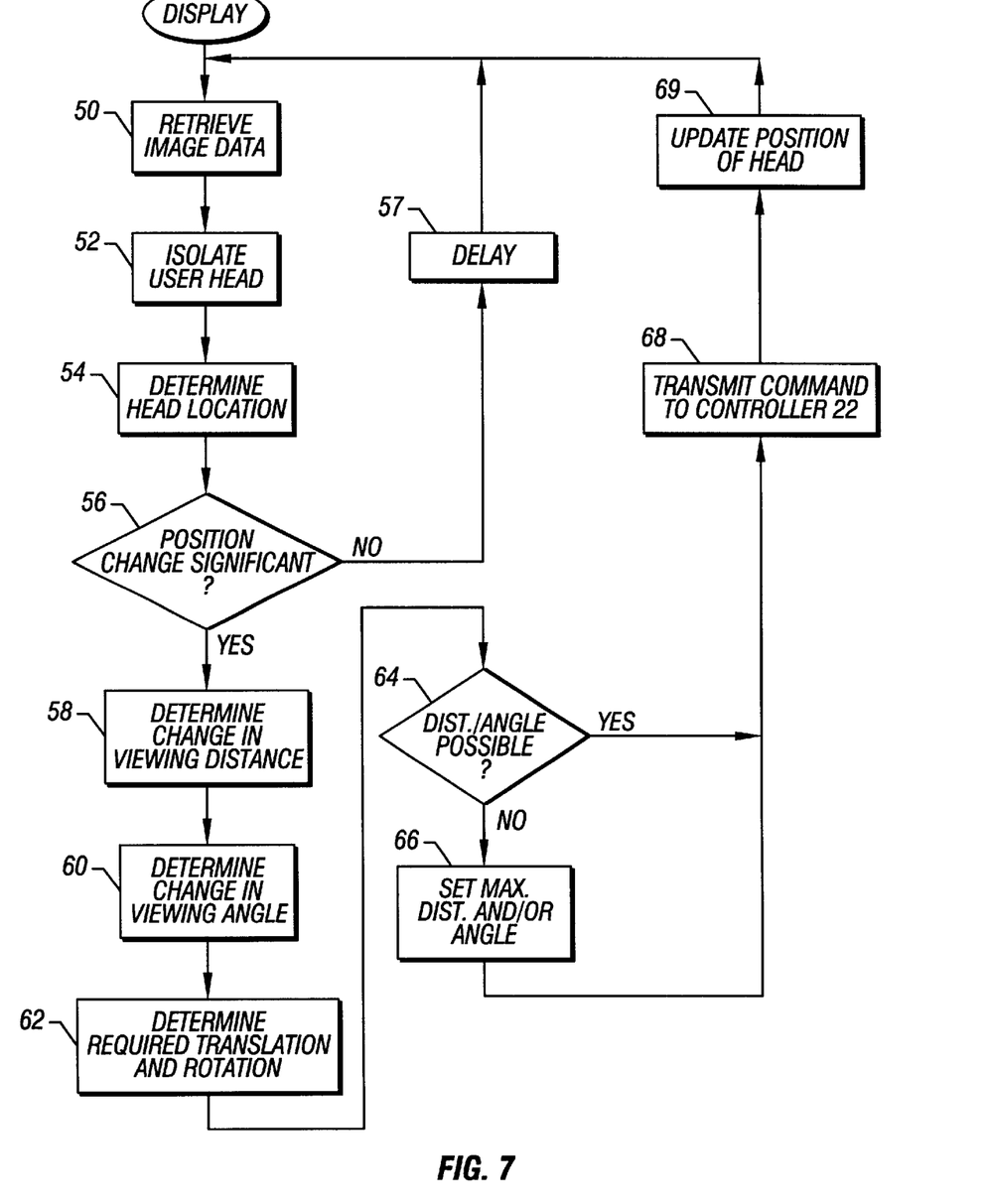
FIG. 7 is a flow diagram illustrating a routine to reposition the display after the viewer moves.

Referring to FIG. 7, the computer unit 28 executes a routine called DISPLAY to restore the viewing angle and viewing distance to their desired values. In the routine, the computer unit 28 retrieves (block 50) the image data that represents the two images. Next, the computer unit 28 isolates (block 52) the images of the head 34. To isolate the image of the head 34, the computer unit 28, might execute, for example, an object recognition routine. Such routines are described in M. C. Burl, M. Weber, T. K. Leung & P. Perona, *From Segmentation to Interpretation and Back*, Springer Verlag (1996); M. C. Burl, T. K. Leung & P. Perona, *Face Localization Via Shape Statistics*, International Workshop on Automatic Face and Gesture Recognition (1995); and T. K. Leung, M. C. Burl & P. Perona, *Finding Faces in Cluttered Scenes*, Proceedings of the IEEE Computer Society Conference on Computer Vision and Pattern Recognition (1995). Using the images of the head 34, the computer unit 28 triangulates to determine (block 54) the current location of the head 34.

If the computer unit 28 determines (diamond 56) that the location of the head 34 has substantially changed, then the computer unit 28 performs additional computations, as described below. Otherwise, the computer unit 28 introduces a delay (block 57) to avoid changing the position of the display 10 every time the head 34 substantially moves, and the computer unit 28 once again retrieves (block 50) the image data and continues the loop. Substantial change may be established, in some embodiments, by comparing the distance that the head 34 has moved with, for example, a predetermined, user selectable value.

When the position of the head 34 substantially changes, the computer unit 28 determines the change in polar coordinates by determining (block 58) the change in viewing distance and determining (block 60) the change in viewing angle.

From this information, the computer unit 28 calculates 62 the translation (i.e., calculates the predetermined distance) and rotation (i.e., calculates the predetermined bearing) to restore the original physical relationship between the display 10 and the viewer. If the computer 28 determines (diamond 64) that the predetermined bearing and/or predetermined distance cannot be met, then the computer 28 sets the distance/bearing to the value(s) that can be met. For example, the assembly 11 may reach the edge of the table 5 and thus cannot move to a position off of the table 5. Lastly, the computer unit 28 transmits (block 68) commands to the controller 22 to cause the desired translation and/or rotation of the display 10, and the computer unit 28 updates (block 69) the stored position of the head 34.

Figure 8:
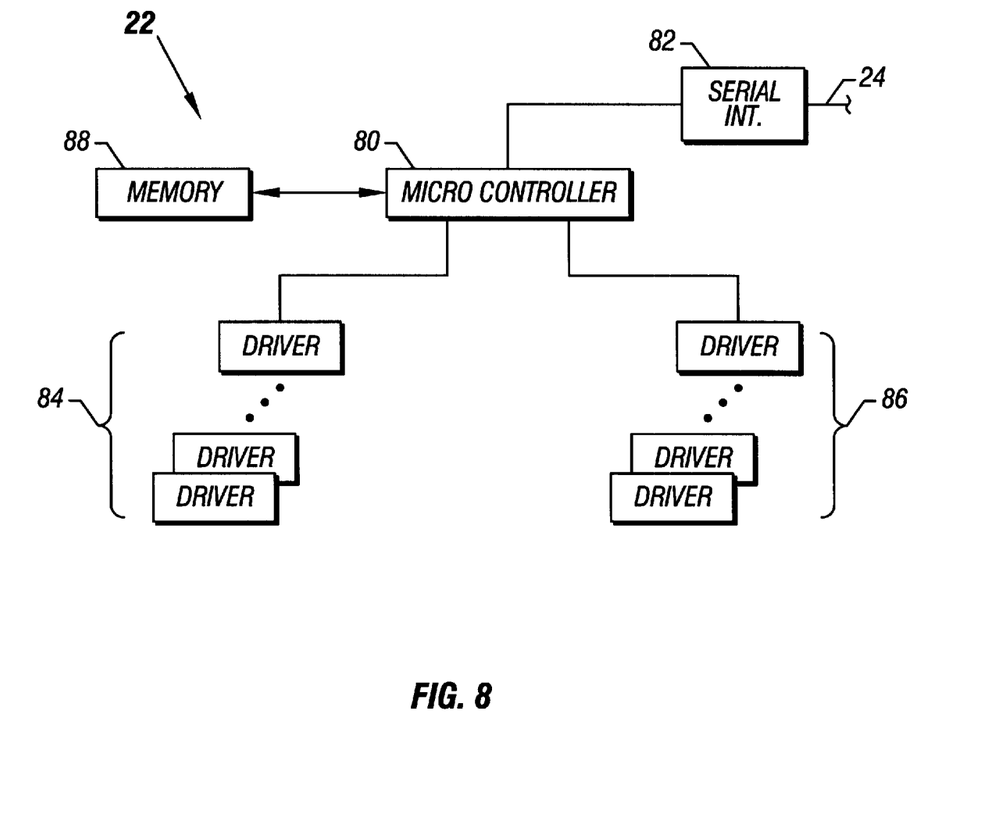
FIG. 8 is an electrical block diagram of a stepper motor controller of FIG. 1.

Referring to FIG. 8, in some embodiments, the controller 22 includes a microcontroller 80 that receives the commands via a serial bus interface 82 that is coupled to the cable 24. The microcontroller 80 controls the stepper motors 17 and 18 through drivers 84 and 86, respectively. To determine when the assembly 12 is at the edge of the table 5, the drivers 86 might sense current in the windings of the motors 18. In this manner, the microcontroller 80 may sense the torque produced by each of the motors 18 and as a result, may determine when one of the wheels 14 is over the edge of the table 5 (i.e., determine when one of the wheels 14 is "spinning"). The microcontroller 80 might also have a memory 88 that is used to store, as examples, instructions to decode commands that are provided by the interface 82, instructions to encode responses for the computer unit 28, instructions to control the stepper motors 17 and 18, and instructions to monitor the torques of the stepper motors 18.

In some embodiments, the computer unit 28 might use user supplied initial conditions to determine when the assembly 11 reaches the edge of the table 5. In this manner, a user might evaluate the distances between the assembly 11 and each edge of the table 5. The user might then provide initial conditions to the computer unit 28 that inform the computer unit 28 about the distance from the assembly 11 to these edges. The computer unit 28 then updates the position of the assembly 11 as the assembly 11 moves and from these initial conditions, determines when the assembly 11 approaches the perimeter of the tabletop.

Figure 9:
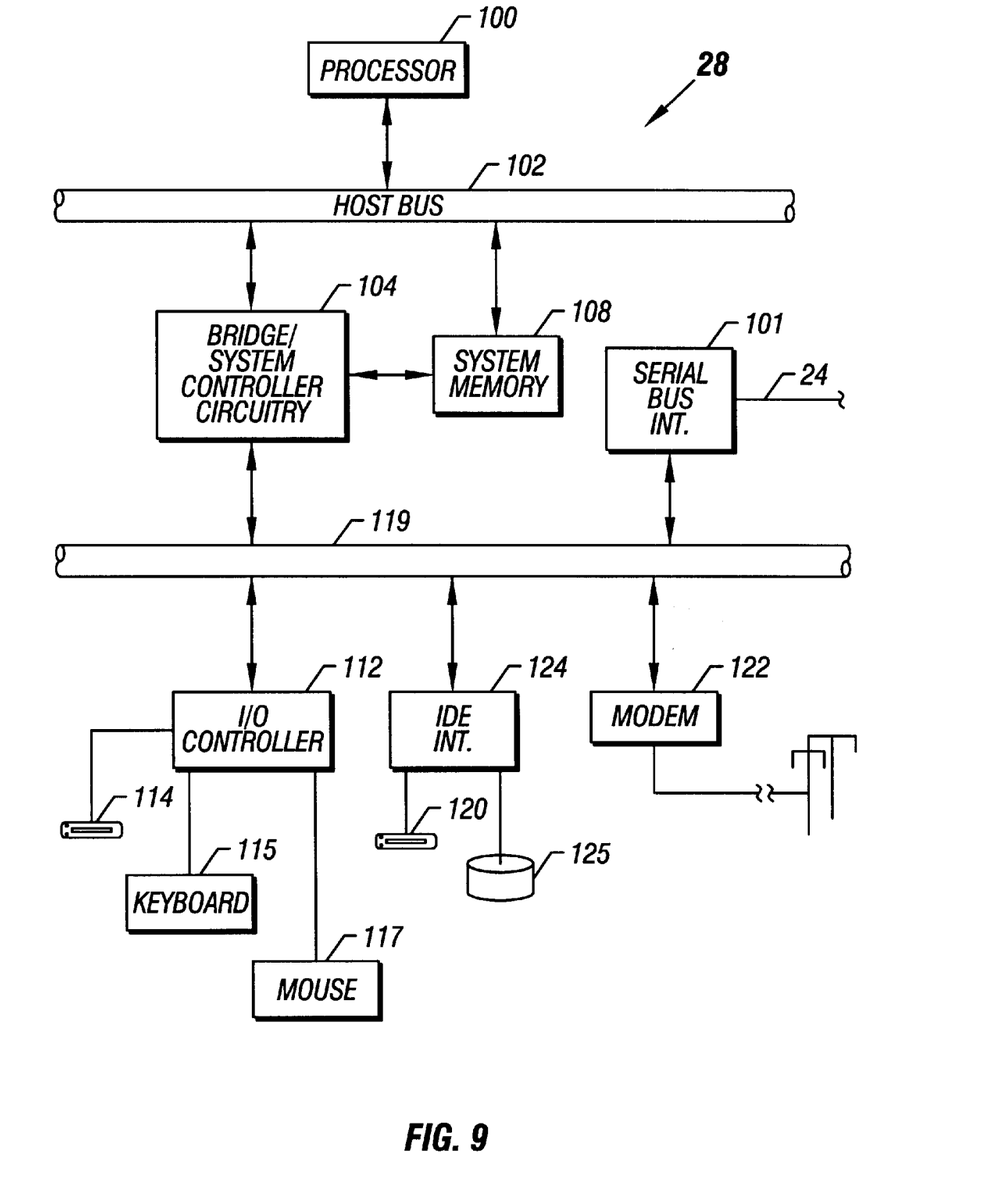
FIG. 9 is an electrical block diagram of the computer of FIG. 1.

Referring to FIG. 9, in some embodiments, the computer unit 28 might include a microprocessor 100 which executes a copy of the DISPLAY routine that is stored in a system memory 108. In this manner, the microprocessor 100 may determine a physical relationship between the display 10 and the viewer, detect when the physical relationship substantially changes and in response to the detection, interact with the assembly 12 to position the display 10 to compensate for the change.

The memory 108, the microprocessor 100 and bridge/system controller circuitry 104 are all coupled to a host bus 102. The circuitry 104 also interfaces the host bus 102 to a downstream bus 119 which is coupled to an I/O controller 112 and a modem 122, as examples. The computer unit 28 may also have, as examples, a floppy disk drive 114, a keyboard 115 and a mouse 117, all of which are coupled to the I/O controller 112. The computer unit 28 may also include an Intelligent Device Electronics (IDE) interface 124 that is coupled to the bus 119 and controls operations of a CD-ROM drive 120 and a hard disk drive 125. The computer unit 28 may also have a serial bus interface 101 that is coupled to the cable 24 and to the downstream bus 119.

Other embodiments are within the scope of the following claims. For example, other range finding devices (an infrared range finder, for example) may be used in place of the camera 26.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method for use with a display screen, comprising:
   determining a physical relationship between the display screen and a viewer of the display screen;
   detecting when the physical relationship substantially changes; and
   in response to the detection, automatically positioning the display screen to compensate for the change.

2. The method of claim 1, wherein the physical relationship includes an angle between the display screen and the viewer.

3. The method of claim 1, wherein the physical relationship includes a distance between the display screen and the viewer.

4. The method of claim 1, wherein the act of positioning includes rotating the display screen to adjust an angle between the display screen and the viewer.

5. The method of claim 1, wherein the act of positioning includes translating the display screen to adjust a distance between the display screen and the viewer.

6. A computer system comprising:
   a display screen;
   an assembly to position the display screen;
   a range finding device; and
   a computer to:
      use the range finding device to determine a physical relationship between the display screen and a viewer of the display screen,
      detect when the physical relationship substantially changes, and
      in response to the detection, interact with the assembly to position the display screen to compensate for the change.

7. The computer system of claim 6, wherein the range finding device comprises a camera.

8. The computer system of claim 6, wherein the physical relationship includes an angle between the display screen and the viewer.

9. The computer system of claim 6, wherein the physical relationship includes a distance between the display screen and the viewer.

10. The computer system of claim 6, wherein the movement of the display screen includes rotating the display screen to adjust an angle between the display screen and the viewer.

11. The computer system 6, wherein the movement of the display screen includes translating the display screen to adjust a distance between the display screen and the viewer.

12. An article comprising a computer readable storage medium that includes instructions to cause a computer to:
   determine a physical relationship between a display screen and a viewer of the display screen;
   detect when the physical relationship substantially changes; and
   in response to the detection, interact with an assembly to position the display screen to compensate for the change.

13. The article of claim 12, wherein the physical relationship includes an angle between the display screen and the viewer.

14. The article of claim 12, wherein the physical relationship includes a distance between the display screen and the viewer.

15. The article of claim 12, wherein the instructions cause the computer to move the display screen by at least rotating the display screen to adjust an angle between the display screen and the viewer.

16. The article of claim 12, wherein the instructions further cause the computer to move the display screen by at least moving the display screen to adjust a distance between the display screen and the viewer.

17. A method for use with a display, comprising:

positioning a display screen on a moveable tray;

positioning the tray on a table;

determining a physical relationship between the display screen and a viewer of the display screen;

detecting when the physical relationship substantially changes; and in response to the detection, automatically moving the tray to reposition the display screen to compensate for the change.

18. The method of claim 17, wherein the physical relationship includes an angle between the display screen and the viewer.

19. The method of claim 17, wherein the physical relationship includes a distance between the display screen and the viewer.

20. The method of claim 17, wherein the act of moving includes rotating the tray to adjust an angle between the display screen and the viewer.

21. The method of claim 17, wherein the act of moving includes translating the tray to adjust a distance between the display screen and the viewer.

22. A computer system comprising:

a moveable tray to be placed on a table;

a display screen located on the tray;

a range finding device; and a computer to:

use the range finding device to determine a physical relationship between the display screen and a viewer of the display screen,     detect when the physical relationship substantially changes, and     in response to the detection, move the tray to reposition the display screen to compensate for the change.

23. The computer system of claim 22, wherein the range finding device comprises a camera.

24. The computer system of claim 22, wherein the physical relationship includes an angle between the display screen and the viewer.

25. The computer system of claim 22, wherein the physical relationship includes a distance between the display screen and the viewer.

26. The computer system of claim 22, wherein the computer moves the tray to rotate the display screen to adjust an angle between the display screen and the viewer.

27. The computer system of claim 22, wherein the computer moves the tray to translate the display screen to adjust a distance between the display screen and the viewer.

\* \* \* \* \*